(No Model.)

2 Sheets—Sheet 1.

J. McMULLIN.
PLOW FOR UNLOADING CARS.

No. 287,698. Patented Oct. 30, 1883.

Attest;
T. Walter Fowler
H. B. Applewhaite

Inventor;
Joseph McMullin
per Attys.
A. H. Evans & Co (No Model.)

J. McMULLIN.

PLOW FOR UNLOADING CARS.

No. 287,698.

2 Sheets—Sheet 2.

Patented Oct. 30, 1883.

Attest;
T. Walter Fowler.
H. B. Applewhite.

Inventor
Joseph McMullin
per attys.
A. H. Evans & Co.

UNITED STATES PATENT OFFICE.

JOSEPH McMULLIN, OF CASEY, IOWA.

PLOW FOR UNLOADING CARS.

SPECIFICATION forming part of Letters Patent No. 287,698, dated October 30, 1883.

Application filed August 24, 1883. (No model.)

*To all whom it may concern:*

Be it known that I, JOSEPH McMULLIN, of Casey, in the county of Guthrie and State of Iowa, have invented a new and useful Improvement in Plows for Unloading Cars, of which the following is a full, clear, and exact description, reference being had to the accompanying drawings, making a part of this specification, in which—

Figure 1:
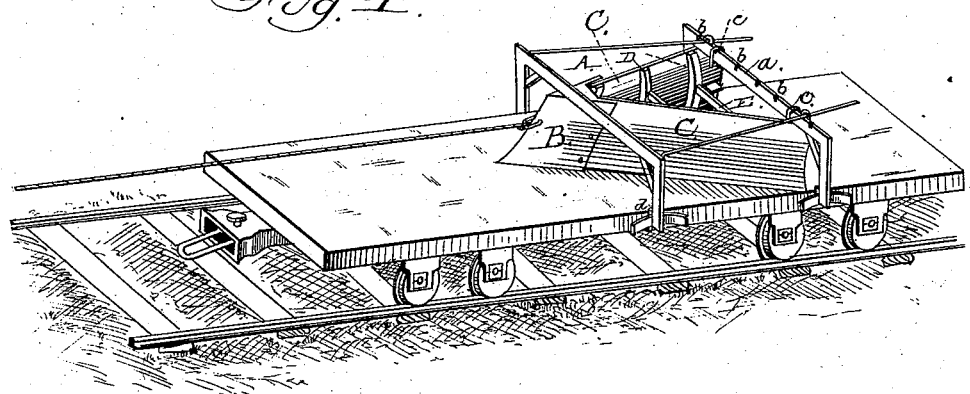
Figure 2:
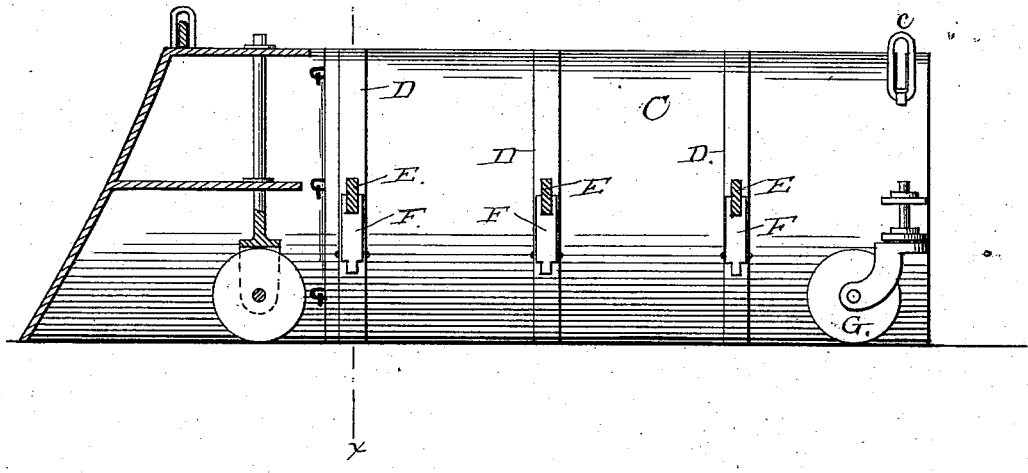
Figure 3:
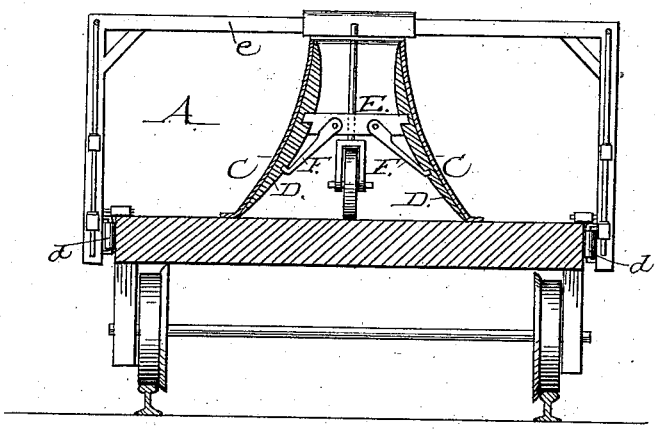
Figure 4:
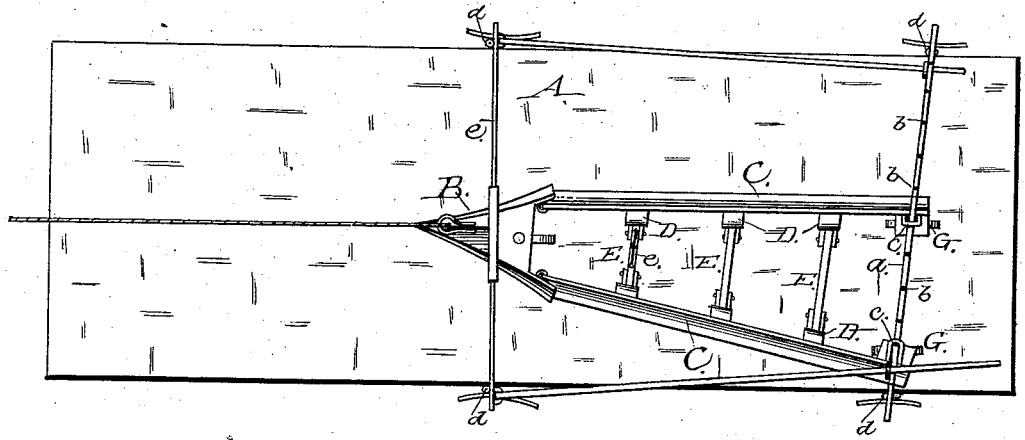
Figure 5:
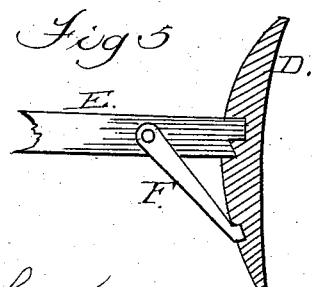

Figure 1 is a perspective view of an unloading-car with my improvements attached. Fig. 2 is a longitudinal section through the center of the plow. Fig. 3 is a transverse section through x x of Fig. 2. Fig. 4 is a plan view with one mold-board parallel to the line of travel. Fig. 5 is a detail, to be referred to.

This invention has for its object to improve the construction of devices for unloading gravel-cars, and is an improvement on Patent No. 135,351, issued to me January 28, 1873; and it consists in the combination of devices hereinafter explained and claimed.

To enable others skilled in the art to make and use my invention, I will proceed to describe the exact manner in which I have carried it out.

In the drawings, A is the frame-work, within which my improved plow works. To the front portion or share, B, of the plow are hinged the mold-boards C C, so as to allow them to be adjusted toward or from each other, for a purpose hereinafter explained. To secure necessary strength to these mold-boards, I cast them with the ribs D on the inner or convex faces. These ribs are slotted, to receive the cross-bars E and braces F, as shown in Figs. 3 and 5. The cross-bars are made removable and of different lengths, to suit the plows when the mold-boards are spread or partially closed, as shown in Fig. 4. The forward cross-bar, e, just behind the hinges, may be slotted, so as to secure adjustability and be permanently attached to the mold-boards by means of set-screws, whereby the mold-boards may be changed as to their relative positions by handling only two of the braces.

In order to secure a ready and easy movement of the mold-boards when being adjusted, I secure beneath the rear end of each a caster, G, and this caster also assists the forward wheel (shown in my said patent) in passing the plow from car to car as it moves forward to its work.

On the rear guide-bar, a, of the frame A are notches b, to secure the clevis c, for holding the mold-board in place. On the inside of the convex shoes attached to the feet of the frame A, I attach small friction-rollers d, whereby I reduce to the minimum the friction of the plow.

It is evident from this construction that I am enabled to remove at one place one half of the dirt or gravel on the car, and then the car can be driven forward, and the other half of the load be discharged at any other point desirable.

The operation of my improved apparatus is as follows: If it be desirable to discharge only half of the car-load at a particular point, one of the mold-boards is drawn in, as shown in Fig. 5, and the plow then driven along the longitudinal center of the car. It is evident that only one half the load will be removed from the car. The plow is then drawn back, and the mold-board again opened, when in its next movement it will discharge or remove the remaining half of the load; and to effect this important result is the main object of my present invention.

Having thus explained my invention, what I claim as new, and desire to secure by Letters Patent, is—

1. The frame A, provided with the notched rear guide-bar, a, in combination with a plow having its mold-boards hinged to the share, and provided with the ribs D and the cross-bars E, whereby the plow may be adjusted to remove one-half of the load of car at a time, substantially as herein described.

2. The frame A, provided with convex shoes, in combination with the friction-rollers d and the mold-boards C C, hinged to the share B, and provided with ribs D and cross-bars E, all constructed to operate substantially as and for the purpose set forth.

3. The share B and hinged mold-boards C C, provided with the ribs D, cross-bars E, and braces F, in combination with the casters G, all constructed to operate substantially as and for the purpose set forth.

JOSEPH McMULLIN.

Witnesses:
F. SHANKLIN,
W. P. COUMER.